United States Patent
Lee et al.

(10) Patent No.: US 7,581,867 B2
(45) Date of Patent: *Sep. 1, 2009

(54) BRIGHTNESS ENHANCEMENT FILM USING AN ARRAY OF LIGHT CONCENTRATORS

(75) Inventors: Junwon Lee, Webster, NY (US); David Kessler, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 66 days.

This patent is subject to a terminal disclaimer.

(21) Appl. No.: 11/483,830

(22) Filed: Jul. 10, 2006

(65) Prior Publication Data

US 2006/0250819 A1    Nov. 9, 2006

Related U.S. Application Data

(63) Continuation of application No. 10/860,545, filed on Jun. 3, 2004, now Pat. No. 7,160,017.

(51) Int. Cl.
*F21V 7/04*    (2006.01)

(52) U.S. Cl. .................. 362/620; 362/600; 362/615; 362/331

(58) Field of Classification Search ......... 362/606–607, 362/331, 612–613, 617–620
See application file for complete search history.

(56) References Cited

U.S. PATENT DOCUMENTS

| | | |
|---|---|---|
| 4,002,499 A | 1/1977 | Winston |
| 4,003,638 A | 1/1977 | Winston |
| 4,799,050 A | 1/1989 | Prince et al. |
| 5,396,350 A | 3/1995 | Beeson et al. |
| 5,396,406 A | 3/1995 | Ketchpel |
| 5,428,468 A | 6/1995 | Zimmerman et al. |
| 5,521,725 A | 5/1996 | Beeson et al. |
| 5,555,109 A | 9/1996 | Zimmerman et al. |
| 5,555,329 A | 9/1996 | Kuper et al. |
| 5,592,332 A | 1/1997 | Nishio et al. |
| 5,598,281 A | 1/1997 | Zimmerman et al. |
| 5,611,611 A | 3/1997 | Ogino et al. |
| 5,629,784 A | 5/1997 | Abileah et al. |
| 5,739,931 A | 4/1998 | Zimmerman et al. |
| 5,748,828 A | 5/1998 | Steiner et al. |
| 5,761,355 A | 6/1998 | Kuper et al. |
| 5,839,812 A | 11/1998 | Ge et al. |
| 5,839,823 A | 11/1998 | Hou et al. |
| 5,887,964 A | 3/1999 | Higuchi et al. |
| 5,917,664 A | 6/1999 | O'Neil et al. |
| 5,944,405 A | 8/1999 | Takeuchi et al. |
| 6,111,696 A | 8/2000 | Allen et al. |

(Continued)

FOREIGN PATENT DOCUMENTS

EP    0 762 182    3/1997

(Continued)

*Primary Examiner*—Ali Alavi
(74) *Attorney, Agent, or Firm*—Edwin Oh

(57) ABSTRACT

A brightness enhancement article and illumination system provides light from a two-dimensional surface. The brightness enhancement article has a plurality of light collecting structures wherein each light collecting structure is longitudinally extended in a length direction along the surface. The structures may have various lengthwise shapes such as being curved, concentric, radial, or of varying thickness.

6 Claims, 12 Drawing Sheets

U.S. PATENT DOCUMENTS

| | | | |
|---|---|---|---|
| 6,129,439 A | 10/2000 | Hou et al. | |
| 6,277,471 B1 | 8/2001 | Tang | |
| 6,280,063 B1 | 8/2001 | Fong et al. | |
| 6,356,391 B1 | 3/2002 | Gardiner et al. | |
| 6,357,888 B1 * | 3/2002 | Takata et al. | 362/620 |
| 6,384,320 B1 | 5/2002 | Chen | |
| 6,425,675 B2 | 7/2002 | Onishi et al. | |
| 7,160,017 B2 * | 1/2007 | Lee et al. | 362/620 |
| 7,164,819 B2 * | 1/2007 | Jenson et al. | 385/39 |
| 2001/0053075 A1 | 12/2001 | Parker et al. | |
| 2003/0117790 A1 | 6/2003 | Lee et al. | |
| 2005/0237768 A1 | 10/2005 | Matsumoto et al. | |
| 2006/0083013 A1 * | 4/2006 | Wanninger et al. | 362/509 |

FOREIGN PATENT DOCUMENTS

| | | |
|---|---|---|
| GB | 2326525 | 12/1998 |
| JP | 8-221013 | 8/1996 |
| JP | 08-221013 A | 8/1996 |
| WO | WO 2004/003604 | 1/2004 |
| WO | WO 2005/083478 | 9/2005 |

* cited by examiner

BRIGHTNESS ENHANCEMENT FILM USING AN ARRAY OF LIGHT CONCENTRATORS

CROSS-REFERENCE TO RELATED APPLICATIONS

This application is a continuation of U.S. Ser. No. 10/860,545 filed Jun. 3, 2004 now U.S. Pat. No. 7,160,017, the contents of which are incorporated herein by reference.

This application is also related to commonly assigned, pending application U.S. Ser. No. 10/785,598 filed on Feb. 24, 2004.

FIELD OF THE INVENTION

The invention generally relates to brightness enhancement articles and more particularly relates to a brightness enhancement film using an array of light concentrator structures for conditioning illumination for use with backlit display devices, such as laptop LCD displays.

BACKGROUND OF THE INVENTION

While LCD displays offer a compact, lightweight alternative to CRT monitors, there are many applications for which LCD displays are not satisfactory due to a low level of brightness, or more properly, luminance. The transmissive LCD used in conventional laptop computer displays is a type of backlit display, having a light-providing surface positioned behind the LCD for directing light outwards, towards the LCD. The light-providing surface itself provides illumination that is essentially Lambertian, that is, having an essentially constant luminance over a broad range of angles. With the goal of increasing on-axis and near-axis luminance, a number of brightness enhancement films have been proposed for redirecting a portion of this light having Lambertian distribution toward normal, relative to the display surface. Among proposed solutions for brightness or luminance enhancement for use with LCD displays and with other types of backlit display types are the following:

U.S. Pat. No. 5,592,332 (Nishio et al.) discloses the use of two crossed lenticular lens surfaces for adjusting the angular range of light in an LCD display apparatus;

U.S. Pat. No. 5,611,611 (Ogino et al.) discloses a rear projection display using a combination of Fresnel and lenticular lens sheets for obtaining the desired light divergence and luminance;

U.S. Pat. No. 6,111,696 (Allen et al.) discloses a brightness enhancement film for a display or lighting fixture. With the optical film disclosed in the '696 patent, the surface facing the illumination source is smooth; the opposite surface has a series of structures, such as triangular prisms, for redirecting the illumination angle. The film disclosed in the '696 patent refracts off-axis light to provide a degree of correction for directing light at narrower angles. However, this film design works best for redirecting off-axis light; incident light that is normal to the film surface may be reflected back toward the source, rather than transmitted;

U.S. Pat. No. 5,629,784 (Abileah et al.) discloses various embodiments in which a prism sheet is employed for enhancing brightness, contrast ratio, and color uniformity of an LCD display of the reflective type. In an embodiment disclosed in the '784 patent, the brightness enhancement film similar to that of the '696 patent is arranged with its structured surface facing the source of reflected light for providing improved luminance as well as reduced ambient light effects. Because this component is used with a reflective imaging device, the prism sheet of the '784 disclosure is placed between the viewer and the LCD surface, rather than in the position used for transmissive LCD systems (that is, between the light source and the LCD);

U.S. patent application publication Ser. No. 2001/0053075 (Parker et al.) discloses various types of surface structures used in light redirection films for LCD displays, including prisms and other structures;

U.S. Pat. No. 5,887,964 (Higuchi et al.) discloses a transparent prism sheet having extended prism structures along each surface for improved back-light propagation and luminance in an LCD display. As is noted with respect to the '696 patent mentioned above, much of the on-axis light is reflected rather than transmitted with this arrangement. Relative to the light source, the orientation of the prism sheet in the '964 disclosure is reversed from that used in the '696 disclosure. The arrangement shown in the '964 disclosure is usable only for small, hand-held displays and does not use a Lambertian light source;

U.S. Pat. No. 6,356,391 (Gardiner et al.) discloses a pair of optical turning films for redirecting light in an LCD display, using an array of prisms, where the prisms can have different dimensions;

U.S. Pat. No. 6,280,063 (Fong et al.) discloses a brightness enhancement film with prism structures on one side of the film having blunted or rounded peaks;

U.S. Pat. No. 6,277,471 (Tang) discloses a brightness enhancement film having a plurality of generally triangular prism structures having curved facets;

U.S. Pat. No. 5,917,664 (O'Neill et al.) discloses a brightness enhancement film having "soft" cutoff angles in comparison with conventional film types, thereby mitigating the luminance change as viewing angle increases;

U.S. Pat. No. 5,839,823 (Hou et al.) discloses an illumination system with light recycling for a non-Lambertian source, using an array of microprisms; and, U.S. Pat. No. 5,396,350 (Beeson et al.) discloses a backlight apparatus with light recycling features, employing an array of microprisms in contact with a light source for light redirection in illumination apparatus where heat may be a problem and where a relatively non-uniform light output is acceptable.

FIG. 1 shows one type of brightness enhancement film 10 for enhancing light provided from a light source 18. Brightness enhancement film 10 has a smooth side 12 facing towards a light guiding plate 14, which contains a reflective surface 19, and rows of prismatic structures 16 facing an LCD component 20. This arrangement, as described in U.S. Pat. Nos. 6,111,696 and 5,629,784 (both listed above), and in 5,944,405 (Takeuchi et al.), generally works well, improving the on-axis luminance by refraction of off-axis light rays and directing a portion of this light closer to the normal optical axis. As FIG. 1 shows, off-axis rays R1 are refracted toward normal. It is instructive to note, however, that, due to total internal reflection (TIR), near-axis light ray R3 can be refracted away from normal at a more extreme angle. In addition, on-axis light ray R4 can actually be reflected back toward light guiding plate 14 for diffusion and reflection from reflective surface 19 rather than directed toward LCD component 20. This refraction of near-axis light and reflection of at least a portion of on-axis light back into light guiding plate 14 acts to adjust illumination luminance with respect to viewing angle, as is described subsequently. By the action of light guiding plate 14 and reflective surface 19, a portion of the light that is reflected back from brightness enhancement film 10 is eventually diffused and again directed outward toward the LCD component at a generally normal angle. There is, of course, some loss of light after multiple reflections, due to inefficiency of reflective surface 19.

The purpose of brightness enhancement film 10, is to redirect the light that is provided over a large angular range from light guiding plate 14, so that the output light it provides to LCD component 20 is generally directed toward normal. By doing this, brightness enhancement film 10 helps to improve display luminance not only when viewed straight-on, at a normal to the display surface, but also when viewed from oblique angles.

As the viewer angle from normal increases, the perceived luminance can diminish significantly beyond a threshold angle. The graph of FIG. 2 shows a luminance curve 26 that depicts the characteristic relationship of luminance to viewer angle when using the brightness enhancement film 10. As expected, luminance peaks at the normal and decreases toward a threshold cutoff angle Ocutoff each side of normal. A slight increase occurs beyond angle Ocutoff; however, this represents wasted light, not readily perceptible to the viewer due to characteristics of the LCD display itself.

With reference to luminance curve 26 in FIG. 2, one characteristic of interest is the overall shape of the curve. The luminance over a range of viewing angles is proportional to the area under the curve for those angles. Typically, the peak luminance values occur at angles near normal, as would be expected. In many applications, it is most beneficial to increase luminance within a small range of viewing angles centered about a normal.

While conventional approaches, such as those noted in the disclosures mentioned hereinabove, provide some measure of brightness enhancement at low viewing angles, these approaches have some shortcomings. Some of the solutions noted above are more effective for redistributing light over a preferred range of angles rather than for redirecting light toward normal for best on-axis viewing. These brightness enhancement film solutions have a directional bias, working best for redirecting light in one direction. For example, a brightness enhancement film may redirect the light path in a width direction relative to the display surface, but have little or no affect on light in the orthogonal length direction. As a result, multiple orthogonally crossed sheets must be overlaid in order to redirect light in different directions, typically used for redirecting light in both horizontal and vertical directions with respect to the display surface. Necessarily, this type of approach is somewhat a compromise; such an approach is not optimal for light in directions diagonal to the two orthogonal axes.

As disclosed above, brightness enhancement articles have been proposed with various types of refractive surface structures formed atop a substrate material, including arrangements employing a plurality of protruding prism shapes, both as matrices of separate prism structures and as elongated prism structures, with the apex of prisms both facing toward and facing away from the light source. For the most part, these films exhibit directional bias, requiring the use of multiple sheets in practical applications.

A number of the patent disclosures have disclosed use of Total Internal Reflection (TIR) effects for redirecting light within prism structures having tilted side walls. For example:

U.S. Pat. Nos. 5,739,931 and 5,598,281 to Zimmerman et al. disclose illumination apparatus for backlighting, using arrays of microprisms and tapered optical structures;

U.S. Pat. No. 5,761,355 to Kuper et al. discloses arrays for use in area lighting applications, wherein guiding optical structures employ TIR to redirect light towards a preferred direction; and U.S. Pat. No. 6,129,439 to Hou et al. discloses an illumination apparatus in which microprisms utilize TIR for light redirection.

Zimmerman et al. '218, Kuper et al. '355, and Hou et al. '439 describe the use of a prism structure having at least one curved side wall shaped to use TIR, including a side wall having a large number of small segments to effectively provide an arcuate shape. While these disclosures show the use of side wall curvature, however, no guidelines are provided for optimizing the actual curvature or dimensions that work best. Some "rule-of-thumb" suggestions are proposed for relative proportions that seem suitable for various applications. However, prism side walls having arbitrary curvature and dimensions may not improve the performance of a brightness enhancement article and may, instead, be detrimental for brightness.

Parabolic reflectors are known in various types of applications for collecting or transmitting electromagnetic energy along an axis. In room lighting applications, for example, parabolic reflectors, and reflectors whose shape approximates a parabolic shape, are positioned around a lamp or other light source to collect light and direct it outward, generally in one direction. For optimal parabolic reflection of light along an axis, the light source is positioned at a focal point for the parabolic reflector.

More efficient light concentrators, such as compound parabolic concentrators (CPC) have been used for collecting light in various applications, particularly for solar energy applications. For example, U.S. Pat. Nos. 4,002,499 and 4,003,638 (both to Winston) disclose the use of reflective parabolic concentrator elements for radiant energy collection. U.S. Pat. No. 6,384,320 (Chen) discloses the use of an array of reflective CPC devices used for a residential solar-power generation system. Light concentrators have also been used to support light sensing devices. For example, UK Patent Application GB 2 326 525 (Leonard) discloses the use of a reflective CPC array as a concentrator for obtaining light for a light sensor, such as a Charge-Coupled Device (CCD). CPC and similar structures have been exploited for collecting and sensing light in various applications, but not for achieving improved light distribution and redirection.

Brightness enhancement films for optical displays have largely been directed to improving brightness of a display over a range of angles. However, spatial uniformity is also important, as it helps to minimize "hot spots" in a display. Existing brightness enhancing films, in an effort to achieve higher brightness, often tend to compromise display uniformity, causing hot spots and other anomalies.

In spite of the concerted effort that has been expended for increasing display luminance, improvements are required, particularly where a high level of near-axis luminance is desired and where spatial uniformity is desirable in the displayed image.

PROBLEM TO BE SOLVED BY THE INVENTION

There is a need for a brightness enhancement film that is light-efficient, improves luminance at near-axis viewing angles, and provides a substantially uniform light source.

SUMMARY OF THE INVENTION

It is an object of the present invention to provide a brightness enhancement article for providing light from a surface, the brightness enhancement article or system comprising:

a plurality of light collecting structures, wherein each light collecting structure is longitudinally extended in a length direction along the light-providing surface, each light collecting structure comprising:
(a) an input aperture optically coupled to the light-providing surface;
(b) an output aperture distal from said input aperture, wherein the output aperture has a surface area that is larger than the surface area of the input aperture; and,
(c) a pair of curved side walls extending along the length-direction and extended from the output aperture toward the input aperture;

wherein, in a cross section taken orthogonally with respect to the length direction, the curved side walls approximate a parabolic curvature.

The structures may have various lengthwise shapes such as being curved, concentric, radial, or of varying thickness.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 6b is a side view of the illumination system from an orthogonal direction to the view in FIG. 6a;

ADVANTAGEOUS EFFECT OF THE INVENTION

Figure 1:
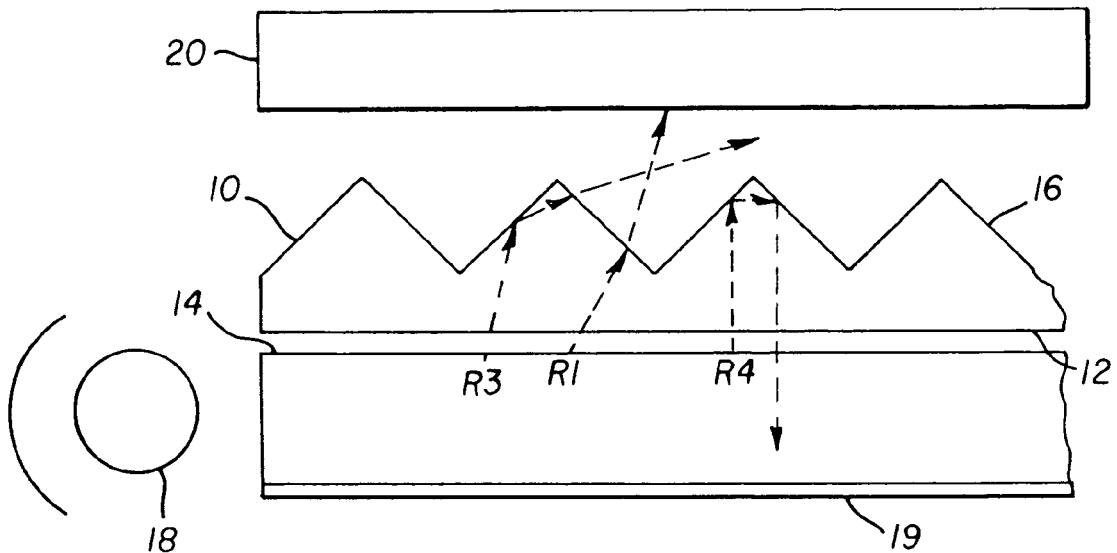
FIG. 1 is a cross-sectional side view showing a brightness enhancement film used with an LCD display.
Figure 2:
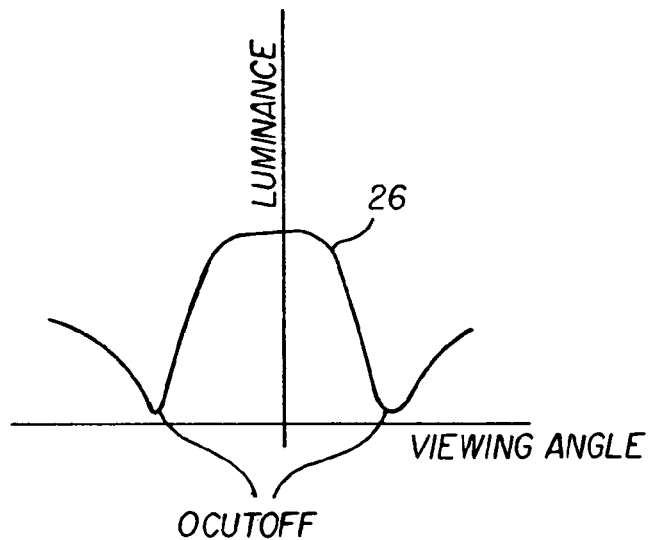
FIG. 2 is a graph showing the relationship of luminance to viewing angle for a brightness enhancement film.

We have found a brightness enhancement film that provides a substantially uniform light source having improved efficiency and with improved luminance at near-axis viewing angles.

DETAILED DESCRIPTION OF THE INVENTION

As has been noted in the background section above, compound parabolic concentrators (CPCs) exhibit a number of favorable light-collecting properties. Referring now to the cross-sectional side view of FIG. 3, the apparatus of the present invention uses an array of light collecting structures 32 of this basic shape, each light collecting structure 32 having a substantially parabolic profile in cross section. Within light collecting structure 32, light rays R, emitted over a wide range of angles from a point P at an input aperture 33 on input surface 34, are reflected due to Total Internal Reflection (TIR) and generally emerge at the same angle from output aperture 35 at output surface 36. Specifically, light rays through point P that reflect from a side wall 38 of collecting structure 32 generally exit at an angle θm that corresponds to the maximum beam angle θm of a reflected ray from that point. With the arrangement of light collecting structure 32 against, or as an integral part of light guiding plate 14, input aperture 33 provides the only exit for the bulk of the light energy within light guiding plate 14. Light guiding plate 14 prevents light leakage, allowing light to exit only through light collecting structures 32, provided that angle θm is maintained at a suitable value.

Figure 3:
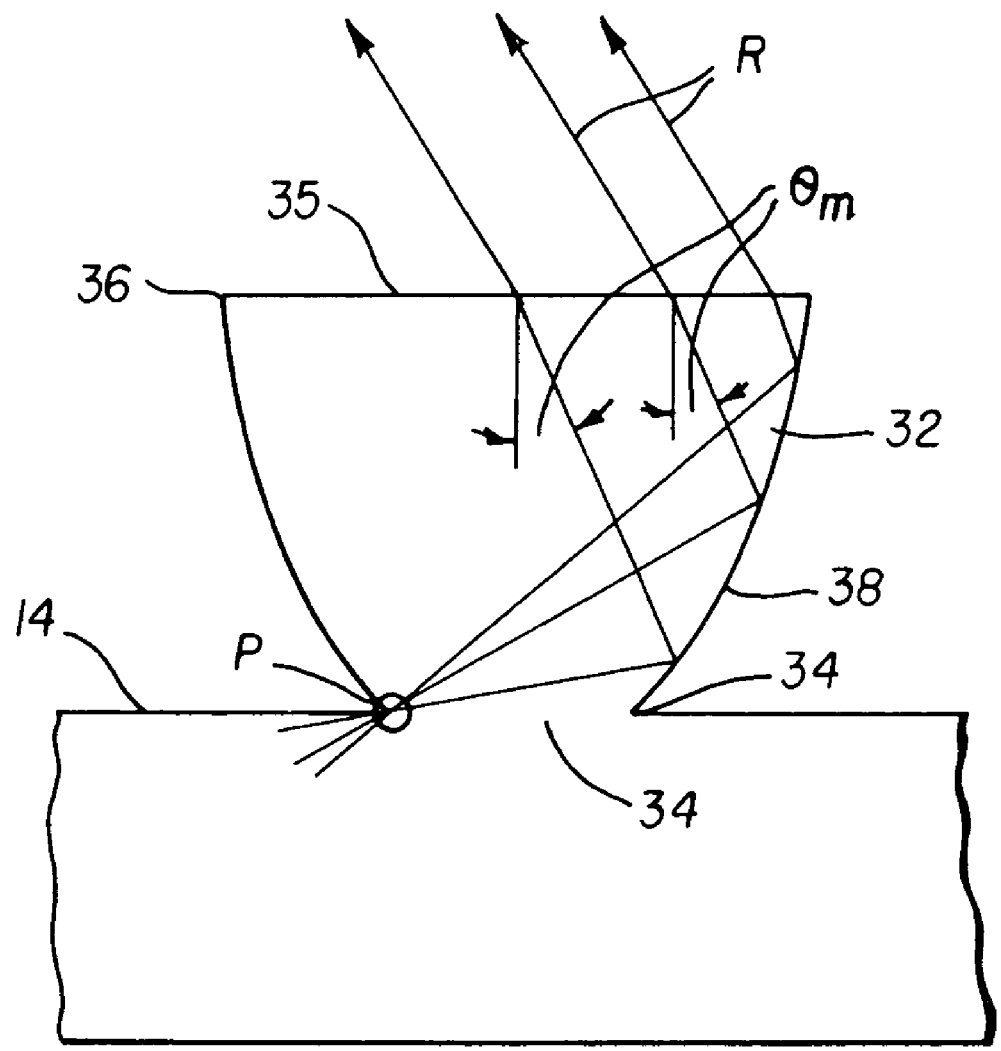
FIG. 3 is a ray diagram showing the behavior of a linear light concentrator in handling light rays according to the present invention.

As is shown in FIG. 3, input surface 34 lies against the surface of light guiding plate 14. Light collecting structures 32 may be fabricated as part of a film, then attached to light guiding plate 14, with each light collecting structure 32 attached at input surface 34. Alternately, light collecting structures 32 may be molded or otherwise formed as an integral part of the surface of light guiding plate 14. The same transparent material is typically used for fabrication of both light collecting structure 32 and light guiding plate 14, whether light collecting structure 32 is separately fabricated or is integral to light guiding plate 14. This arrangement allows the same index of refraction n for both light collecting structure 32 and light guiding plate 14.

By way of review, TIR (for a structure in air) is achieved when critical angle φTIR for incident light is exceeded as defined in equation (1) below, where n is the index of refraction of the material used for light collecting structure 42:

$$\varphi_{TIR} = \sin^{-1}\left(\frac{1}{n}\right) \qquad (1)$$

Figure 4A:
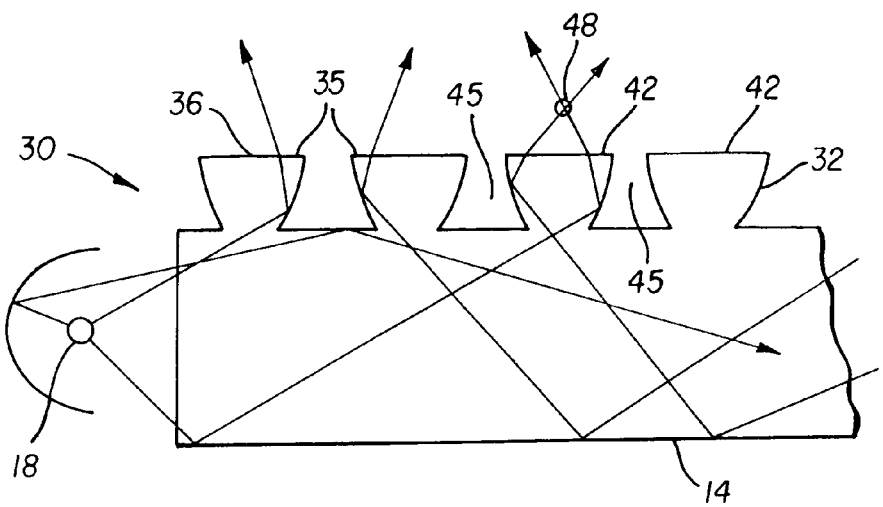
FIGS. 4a and 4b are cross-sectional side views showing a portion of an illumination apparatus in different embodiments of the present invention.

The present invention takes advantage of the light-handling behavior of a parabolic collector, as shown by light collecting structure 32 in FIG. 3, in one direction. Referring to FIG. 4a, there is shown a cross-section view of a portion of a brightness enhancement film 30 coupled to light guiding plate 14. Ribbed light collecting structures 42 are formed having a generally parabolic cross-section, extended along a length direction. As noted above, brightness enhancement film 30 is part of, or in contact with, light guiding plate 14. Each light-collecting structure 42 guides light originated from one or more light sources 18 and guided by light guiding plate 14, using methods well known in the display imaging arts.

Still referring to FIG. 4a, the cross-sectional shape of each linear light-collecting structure 42 can be considered as defined by a pair of grooves 45. It can be observed that the sides of each groove 45 are generally concave, thus forming the sides of light-collecting structures 42 to have a substantially convex shape.

Figure 4B:
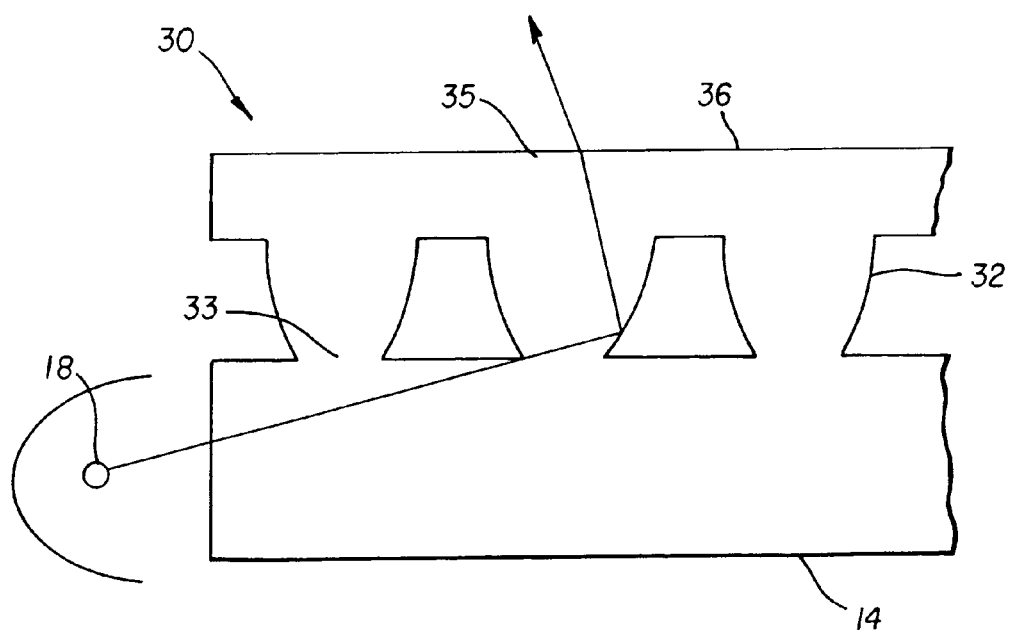

FIG. 4b shows an alternate embodiment, in which brightness enhancement film 30 also has an additional output surface 36 that provides support structure for individual light collecting structures 42.

Figure 5:
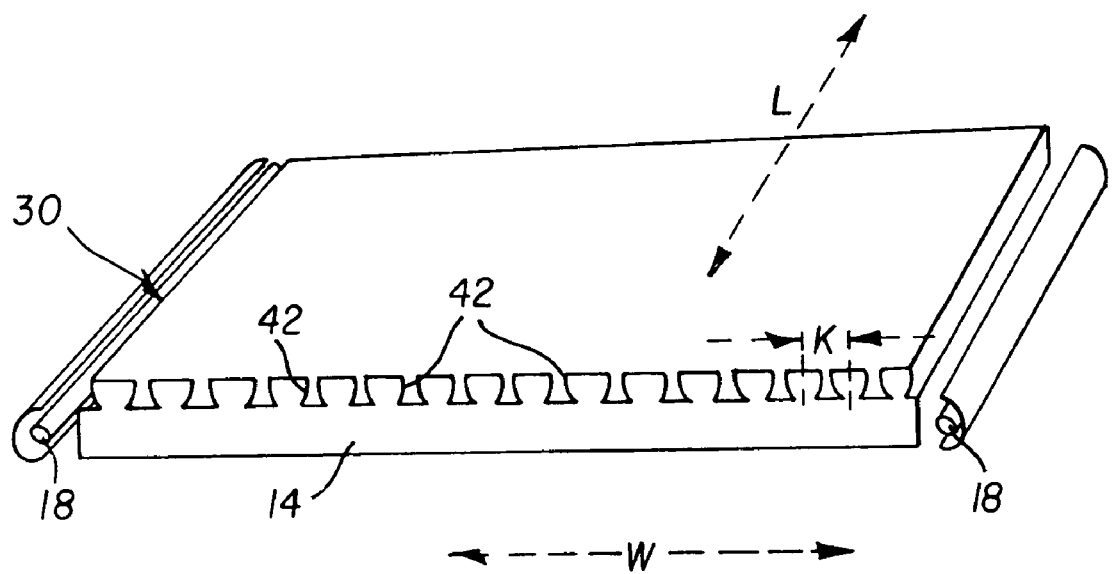
FIG. 5 is a perspective view of a brightness enhancement film according to the present invention.

Referring to the perspective view of FIG. 5, the three-dimensional structure of brightness enhancement film 30 in one embodiment is shown, with light collecting structures 42 exaggerated in size for illustrating key relationships. Each individual linear light-collecting structure 42 extends along the input side of brightness enhancement film 30 in a length direction L along the film. In the orthogonal width direction W, linear light-collecting structures 42 appear as ribs or ridges (from the perspective of light guiding plate 14). With this arrangement, the advantageous properties of the ideal parabolic profile apply for light in one direction. That is, with respect to the directions indicated in the perspective view of FIG. 5, light angles in the W direction can be redirected, in the manner shown in FIG. 3, using brightness enhancement film 30. In one embodiment, light collecting structures 42 extend along the direction of length L, substantially in parallel with the central axis of light source 18, a CCFL bulb.

Figure 6A:
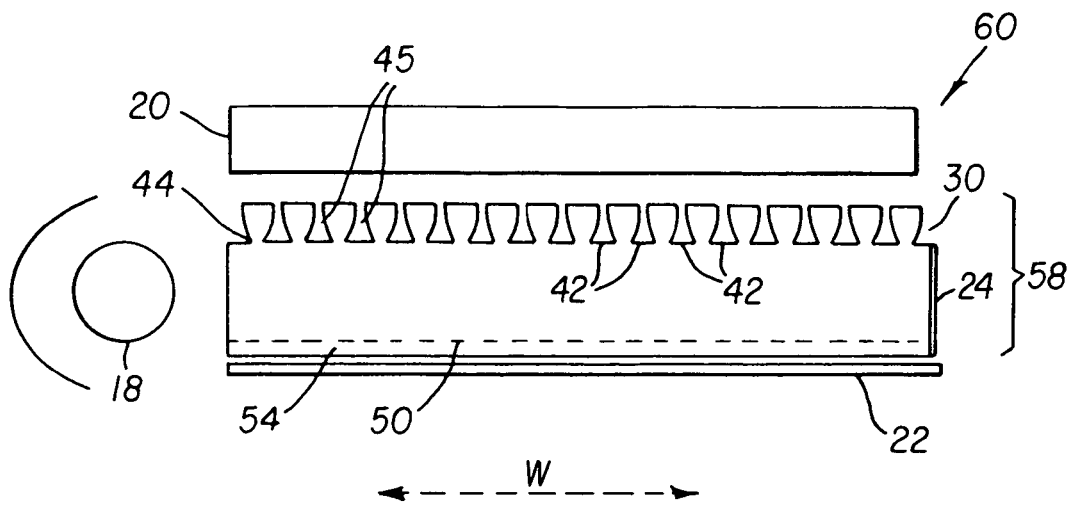
FIG. 6a is a side view of an illumination system according to the present invention.
Figure 6B:
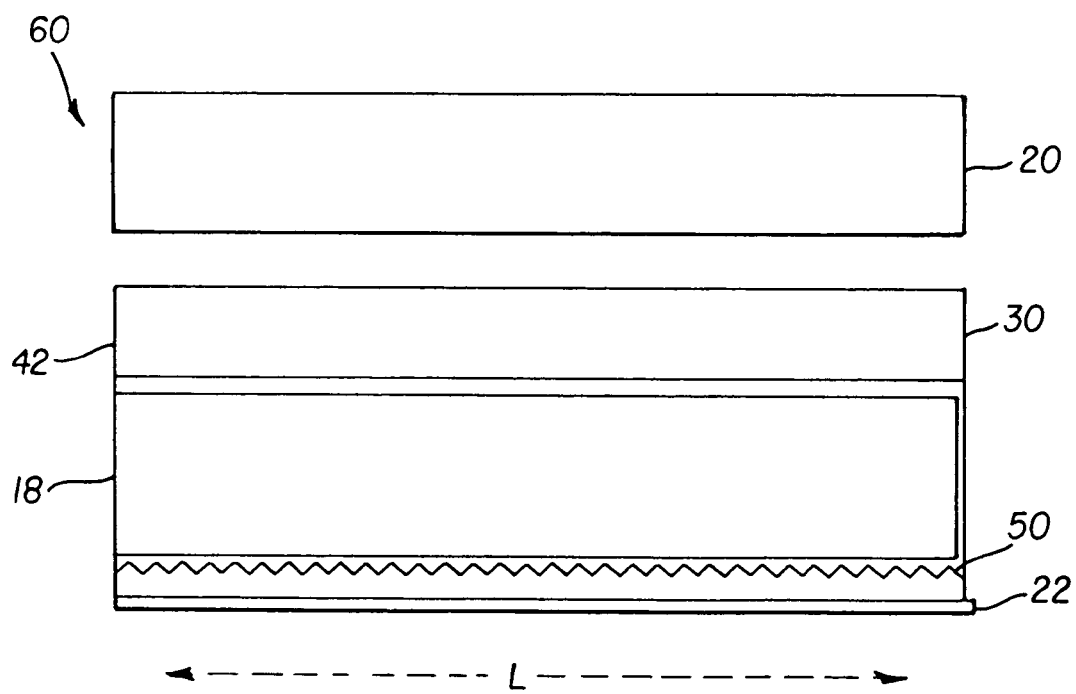
Figure 7:
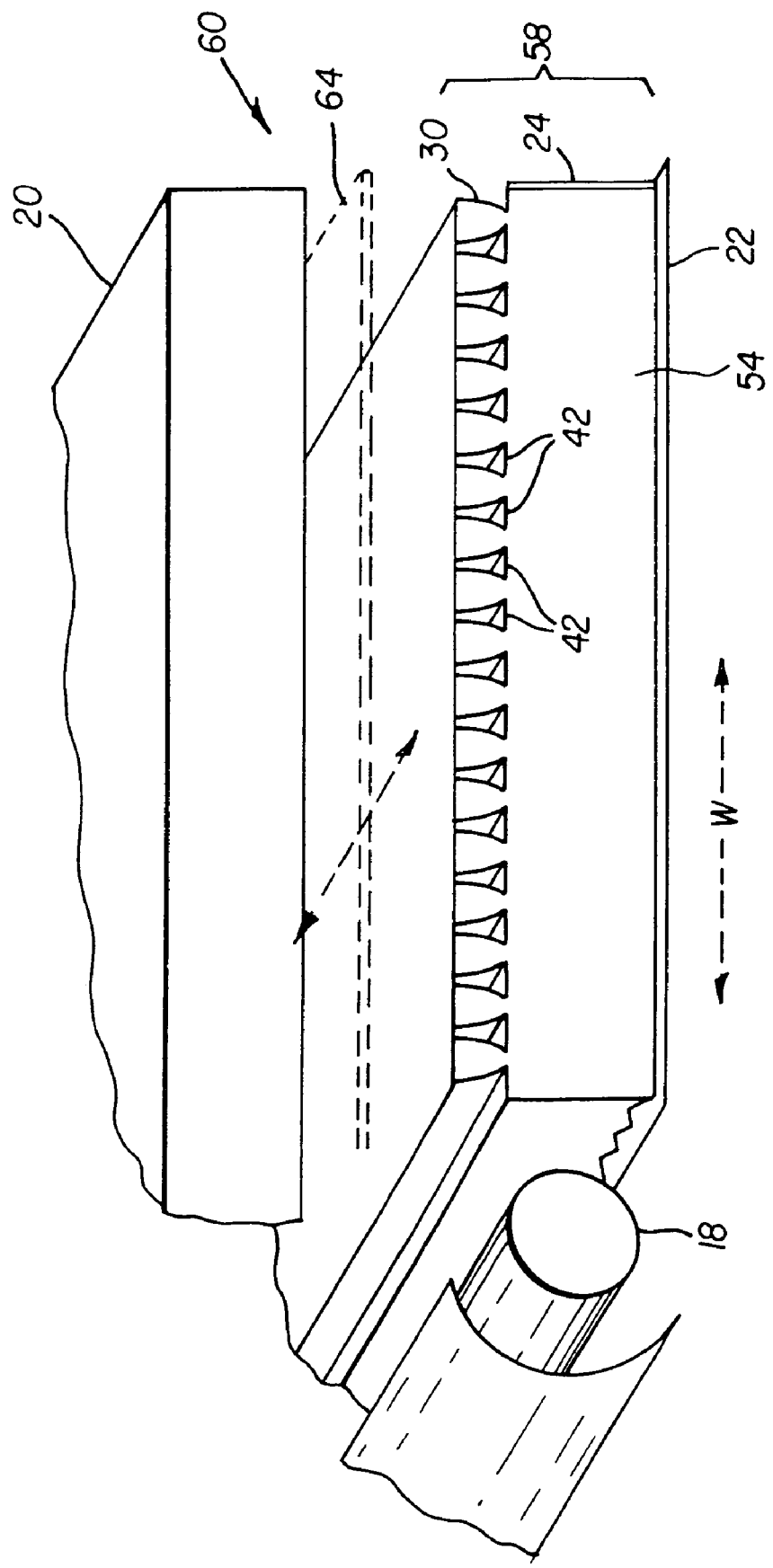
FIG. 7 is perspective view of the illumination system of FIGS. 6a and 6b.

As is shown in front and side views of FIGS. 6a and 6b, and in the perspective view of FIG. 7, a combination of light-directing structures redirect light as part of an illumination system 58 for a display apparatus 60. In the embodiment shown, a single light source 18 provides light to a light guiding plate 54 having a reflective surface 24. Alternately, multiple light sources 18 could be provided. From the front view of FIG. 6a, the substantially parabolic shape of each individual linear light-collecting structure 42 in brightness enhancement film 30 is shown. Input surface 44 of brightness enhancement film 30 lies against light guiding plate 54. Illumination system 58 delivers source illumination to an LCD component 20. An optional light conditioning article 64 could be provided for illumination system 58, as shown in dotted outline in FIG. 7. Light conditioning article 64 could be, for example, a reflective polarizer or a diffuser. Multiple light conditioning articles 64 could be used in combination for supporting illumination system 58.

It must be emphasized that illumination system 58 components are not drawn to scale in FIGS. 5, 6a, 6b, or 7; these and other figures exaggerate size in an effort to show overall function of each component. For most embodiments, light-collecting structures 42 are typically much smaller in scale than is represented in these figures.

FIG. 6b shows a side view in which display apparatus 60 is rotated orthogonally from its position in FIG. 6a (in the plane of input surface 44). From the view of FIG. 6b, only the outermost light collecting structure 42 would be visible, as it extends along length L of brightness enhancement film 30. For improved directional control of light along the length L direction, a prism array structure 50 is provided above bottom reflective surface 22. In this embodiment, structures on prism array structure 50 run in an orthogonal direction to grooves 45 that define linear light-collecting structures 42. The orthogonal orientation of prism array structure 50 with respect to brightness enhancement film 30 thus provides redirection of illumination in both W and L directions. Prism array structure 50 can be formed on the base of light guiding plate 14 by molding or by some other method.

Optimizing the Cross-Sectional Shape of Light-Collecting Structures 42

Referring back to FIG. 3, the theoretical performance of light collecting structure 32 having side walls 38 that closely follow a parabolic profile was shown for a small number of rays R. In order to adapt this principle to practical applications and to be able to fabricate brightness enhancement film 30 at lower cost, it would be beneficial to understand more clearly how light collecting structure 32 operates. Then, armed with a more precise knowledge of light behavior through light collecting structure 32, it is possible to adapt the idealized shape of light collecting structure 32 (FIG. 3) to the practical application of light collecting structure 42 (FIG. 4a) of brightness enhancement film 30. For example, it may be possible to relax some tolerances, and adapt a shape for light collecting structure 42 that can be more easily fabricated. It is also possible to minimize crossing effects, as described above, by suitable selection of curvature and dimensional parameters.

Figure 8A:
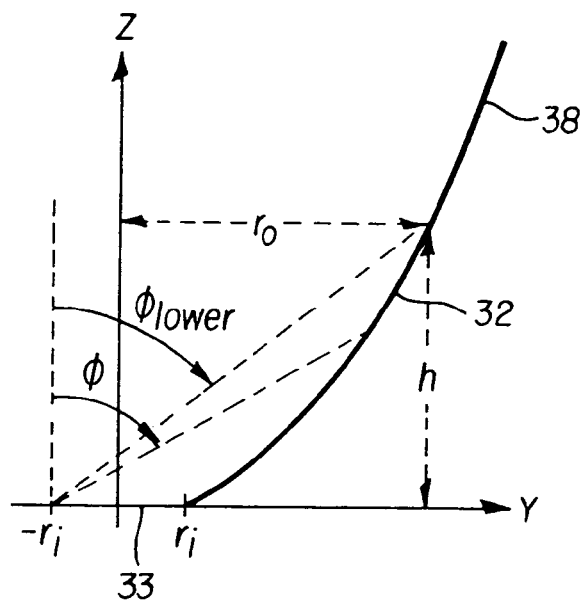
FIG. 8a is a side view showing the role of key parameters in determining the cross-sectional shape of side walls.

Referring to FIG. 8a, there is shown a cross-sectional shape of side wall 38 of light collecting structure 32, with key dimensions and angular relationships. As was noted with reference to FIG. 3, angle θm defines the maximum beam angle, relative to normal, for the given cross-sectional shape of light collecting structure 32. This means that light entering light collecting structure 32 at input aperture 33 is at some angle φ where $$\theta m \leq \phi \leq 90° \tag{2}$$

Where angle θm is as shown in FIG. 3. Dimensions $r_i$ and $r_0$ in FIG. 8a are, respectively, input and output aperture radii of light collecting structure 32.

In terms of x, z coordinates, the point at which a ray at angle φ impinges on side wall 38 is represented using the following notation $$P(x(\phi; \theta_m, \theta_r), z(\phi; \theta_m, \theta_r)) \tag{3}$$

where value φ is a variable that determines position along side wall 38 of light collecting structure 32; values $\theta_m$ and $\theta_r$ are selectable design parameters. Generally, considering the luminance distribution of reflected beams from light collecting structure 32, angle $\theta_m$ controls the overall angular range and angle $\theta_r$ controls the angular location of the luminance peak. Therefore, the angle $\theta_r$ can also be controlled to minimize or eliminate crossing effects, as explained subsequently. In order to position the peak luminance on axis, a rule-of-thumb value for $\theta_r$ is computed using:

$$\theta_r \approx \frac{1}{2}\theta_m. \tag{4}$$

Typical values for $\theta_r$ are within the 10-30 degree range.

Note that that $\theta_m$ is not necessarily equal to the angular range of luminance, but is proportional to this angular range. Likewise, $\theta_r$ is not equal to the angular location of the highest peak in luminance distribution, but determines the location of this peak.

A first step in optimizing the shape of light collecting structure 32 is to select a suitable value for the input aperture radius, $r_i$. Significant considerations for doing this include relative size; as $r_i$ diminishes, light collecting structures 32 become less visible and may be less likely to cause Moiré patterns. However, if $r_i$ is too small, light collecting structures 32 may be more difficult to fabricate.

Once a value for $r_i$ is determined, the next step is to select a suitable value for $\theta_m$. This depends on application criteria. For a small display, for example, it may be desirable to have smaller viewing angle and high luminance. In such a case, a suitable $\theta_m$ value might be in the 10-30 degree range. For a larger display, a larger $\theta_m$ value would normally be used.

As is noted above and as can be seen from FIG. 8a, angle $\phi$, measured from the line of $y(z)=-r_i$, varies between an upper bound of $\pi/2$ and some lower bound $\phi_{lower}$ that is generally larger than $\theta_m$. This lower bound $\phi_{lower}$ can then be used, along with design parameter values $\theta_m$ and $\theta_r$, to determine the output radius $r_o$ and height h of light collecting structure 32.

Figure 8B:
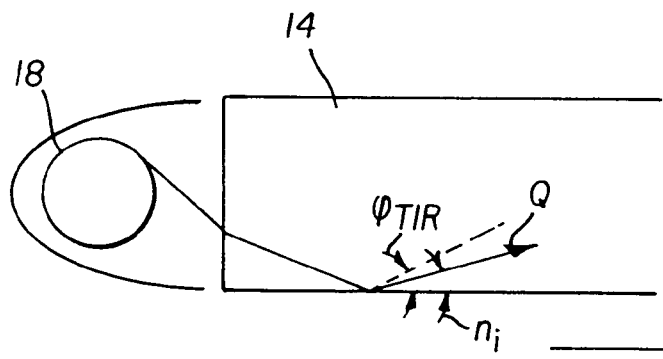
FIG. 8b is a side view showing a TIR angle within a light guiding plate.

In order to understand the criteria for specifying lower bound $\phi_{lower}$ in an application, it is useful to review how light guiding plate 14 works, as shown in FIGS. 4a and 4b. Within light guiding plate, TIR is utilized to contain a light beam until it emerges from light guiding structure 32. Due to Fresnel's law, once a beam enters light guiding plate 14, its beam angle $\eta_i$ relative to the Y-axis, as shown in FIG. 8b, remains smaller than the TIR angle $\phi_{TIR}$, as given in equation (1), where n is the refractive index of light guiding plate 14. Because light guiding structure 32 has the same (or very nearly the same) refractive index n, this angular restriction also applies within light guiding structure 32.

Figure 8C:
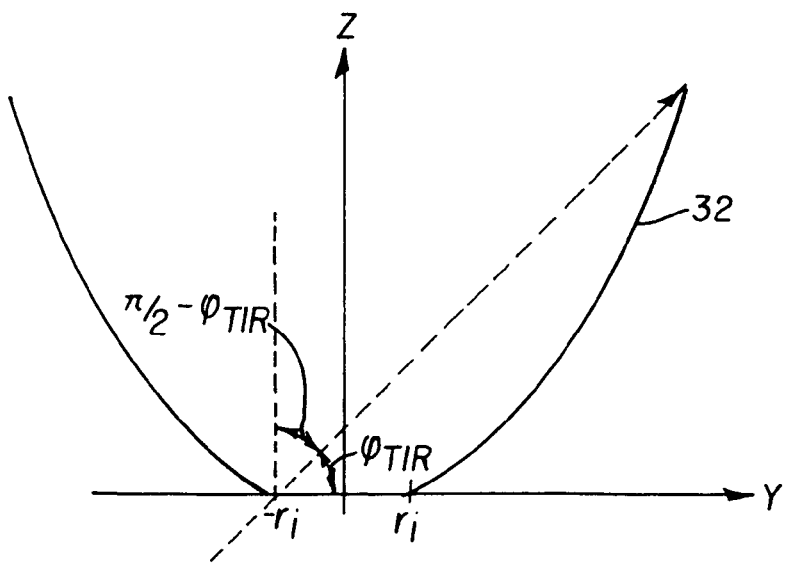
FIG. 8c is a side view showing how parameters are used to obtain y-z coordinates for sidewalls of a light collecting structure according to the present invention.

Referring now to FIG. 8c, there is shown (as a dotted line) the path of a beam entering light guiding structure 32 at the most extreme possible angle, $\phi_{TIR}$. Relative to the normal (Z-axis), every other beam of light entering light guiding structure 32 is greater than or equal to:

$$\pi/2 - \phi_{TIR} \quad (5)$$

Recall that $\phi_{lower}$ is measured from the line $y(z)=-r_i$, as shown in FIG. 8a. It is recommended that $\phi_{lower}$ not be much smaller than $\pi/2 - \phi_{TIR}$; otherwise, the resulting height h of light guiding structure 32 may be excessive, making fabrication more complex. It is preferred to keep height h short and to maintain a small aspect ratio (defined by height h over width $r_o$). In general:

$$\phi_{lower} \sim \pi/2 - \phi_{TIR} = \pi/2 - \sin^{-1}(1/n) \quad (6)$$

With this, the following range applies for variable $\phi$:

$$\pi/2 - \sin^{-1}(1/n) \leq \phi \leq \pi/2 \quad (7)$$

With this value determined, the overall shape of light collecting structure 32 can be computed using the following:

$$y(\phi; \theta_m, \theta_r) = \frac{2f\sin(\phi - \theta_r)}{1 - \cos(\phi + \theta_m)} + r_i[2\cos(\theta_r) - 1] \quad (8, 9)$$

$$z(\phi; \theta_m, \theta_r) = \frac{2f\cos(\phi - \theta_r)}{1 - \cos(\phi + \theta_m)} - 2r_i\sin(\theta_r)$$

where $r_i$ is the radius of input surface and $f=r_i[1+\sin(\theta_m)]$.

The output aperture radius $r_o$ and height h can be computed by finding the point on side wall 38 with the following coordinates:

$$y(\phi=\phi_{lower}; \theta_m, \theta_r) = r_o, z(\phi=\phi_{lower}; \theta_m, \theta_r) = h \quad (10)$$

The following computations determine output aperture radius, $r_o$ and height h:

$$r_o = \frac{2f\sin(\pi/2 - \sin^{-1}(1/n) - \theta_r)}{1 - \cos(\pi/2 - \sin^{-1}(1/n) + \theta_m)} + r_i[2\cos(\theta_r) - 1] \quad (11)$$

$$h = \frac{2f\cos(\pi/2 - \sin^{-1}(1/n) - \theta_r)}{1 - \cos(\pi/2 - \sin^{-1}(1/n) + \theta_m)} - 2r_i\sin(\theta_r)$$

The following is a summary of steps, with example values, showing how suitable values can be determined in one embodiment:

Step 1. Determine values for $r_i$ and $\theta_m$.

Here, assume $r_i=25\mu m$. For a small device, ±20 degree of viewing angle would be sufficient, which results in $\theta_m=20°$.

Step 2. Determine value for $\theta_r$.

Using equation (4), $\theta_r$ can be about 10 degrees. Choose a practical value, for example, 8 degrees.

Step 3. Determine a value for parameter $\phi_{lower}$.

For light guiding plate 14 fabricated from PMMA, n=1.49.

From equations (6) and (7), $\phi_{lower} \sim 47$ degrees.

Step 4. Compute values of radius $r_o$ and height h, using equation (11).

Here, $r_o=66.9 \mu m$ and $h=66\mu m$.

Design Considerations

A number of constraints impose themselves on any workable design for light-collecting structure 42 (FIGS. 4a-7) and necessitate some consideration of tradeoffs for achieving the optimal design. For example, for increased luminance near a normal angle, it is typically best to keep $\theta_m$ within a small range of values. However, because input aperture 33 limits the overall amount of light into light collecting structure 42, some compromise must be struck between achieving a preferred range of angles and providing sufficient luminance at those angles.

Figure 9A:
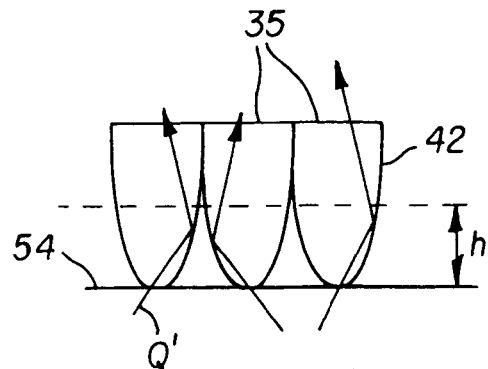
FIGS. 9a, 9b, and 9c are side views used to describe modifications that can be made to the basic shape and dimensions of a light collecting structure, which is generally parabolic in cross-section as used in the present invention.
Figure 9B:
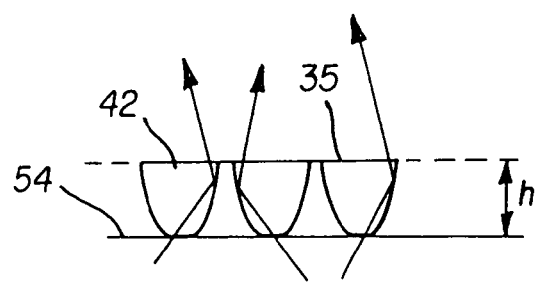

In working with practical light collecting structure 42 designs, it has been observed that impingement points $P(x(\phi), z(\phi))$ are generally distributed nearer to input aperture 33 than to output aperture 35, as is shown in FIG. 9a when light entering light guide plate is confined within a certain cone of angles as shown in FIG. 8b. In representing this, ray Q in FIG. 8b can be considered to be the same as ray Q' in FIG. 9a. Due to this effect, it is possible to reduce height h, as is shown in the cross-sectional ray diagram of FIG. 9b, using the minimum height h specified in equation (11). This provides a number of practical advantages for fabrication of brightness enhancement film 30, simplifying manufacture and enhancing mechanical stability. This modification also boosts brightness by improving the overall fill factor.

Figure 10A:
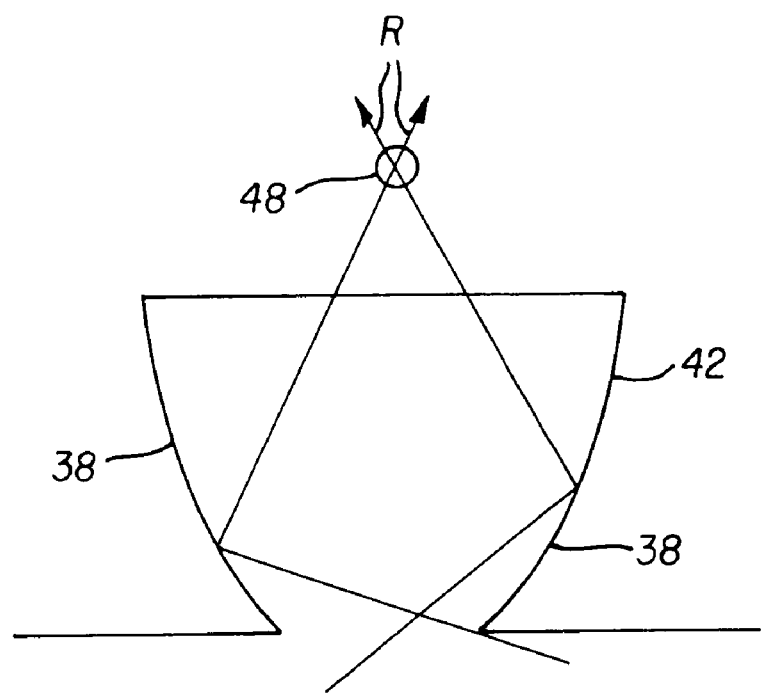
FIGS. 10a and 10b are cross-sectional schematic views showing light behavior without and with slight rotation of each sidewall of a light collecting structure according to the present invention.
Figure 10B:
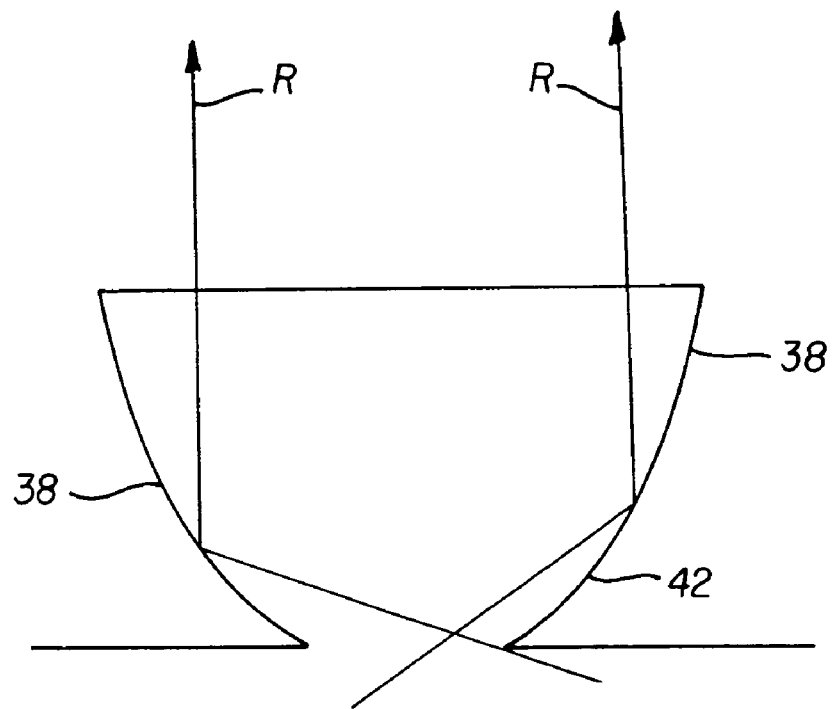

The problem of crossing effect was described above with respect to FIG. 4a. Referring back to the side view of FIG. 4a, it can be observed that rays from opposite directions can enter the same light collecting structure 42 and may cross at a crossing point 48 along the transmission path. Where this behavior occurs, unwanted crossing effects may cause off-axis peak brightness enhancement film 30 output. It has been shown that crossing effect can be minimized by rotating a side wall with an angle of $\theta_r$. The sequence of FIGS. 10a and 10b shows how this crossing effect can be minimized by a slight change to the side wall 38 curvature of light collecting structure 42, without increasing the relative height h. Crossing point 48 from rays R in the embodiment of FIG. 10a is corrected by the resulting change of TIR behavior within light collecting structure 42 caused by reshaping side walls 38.

Rotation of side wall 38, as shown in FIG. 10*b*, provides the further advantage of increasing on-axis luminance of brightness enhancement film 30.

Figure 9C:
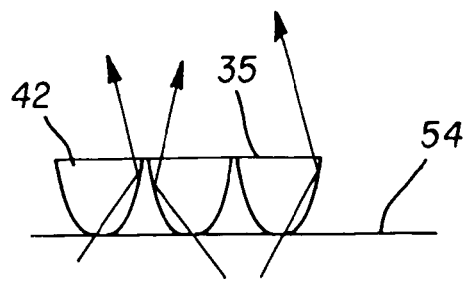
Figure 11A:
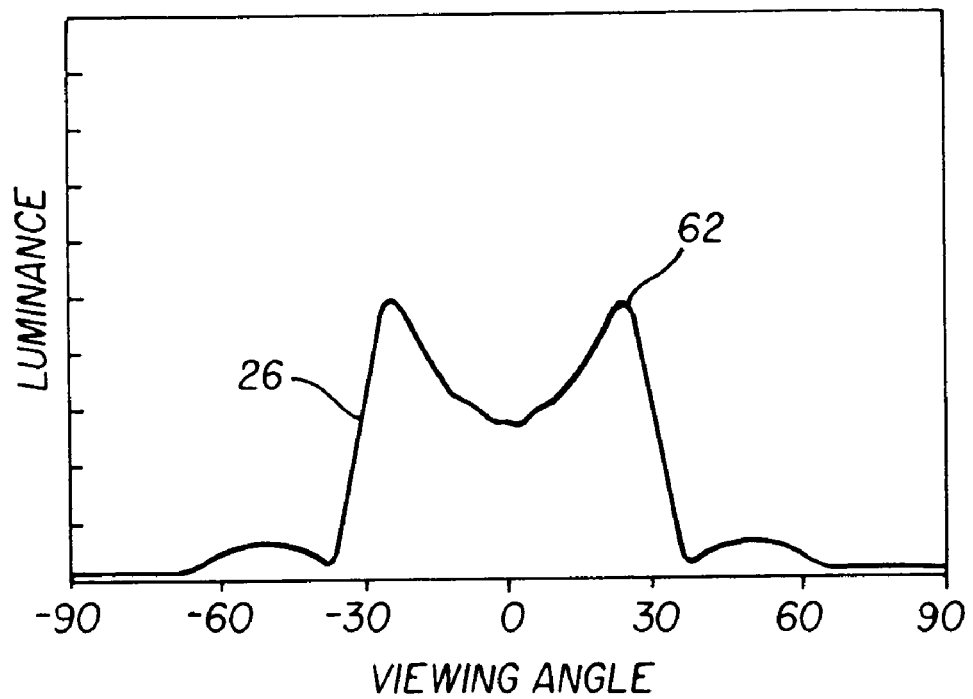
FIGS. 11a and 11b are graphs showing relative luminance relative to view angle without and with modifications to the shape of light collecting structures according to the present invention.
Figure 11B:
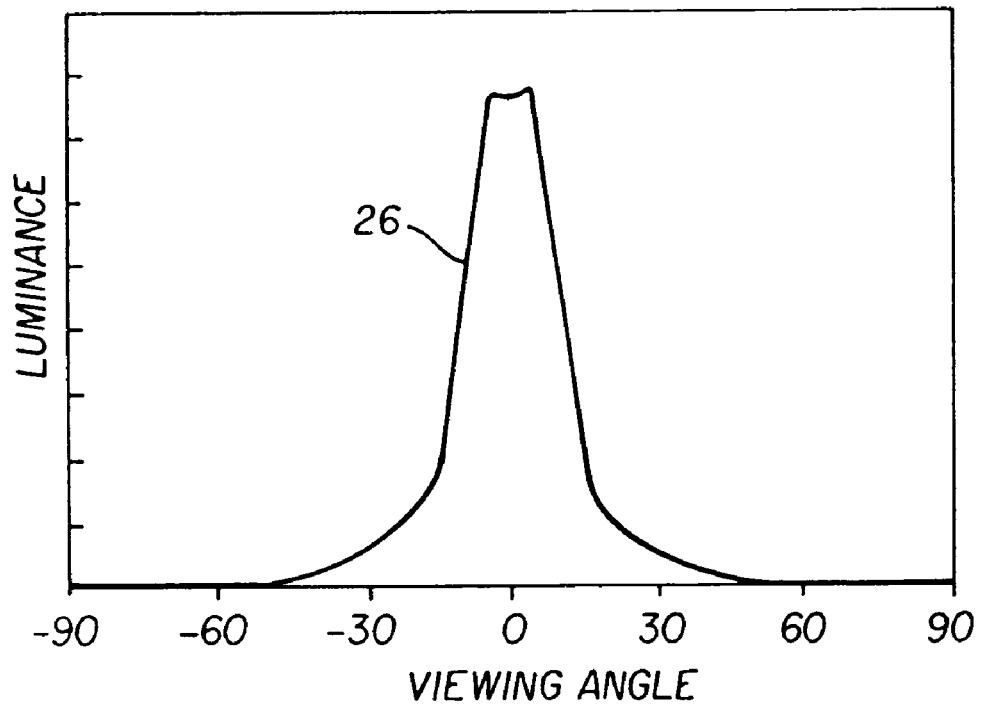

Luminance curves 26 in FIGS. 11*a* and 11*b* show the effect of optimizing side wall 38 curvature, as shown in corresponding FIGS. 10*a* and 10*b* and as described above with reference to FIGS. 9*a*, 9*b*, and 9*c*. Without optimization of side wall 38 curvature, off-axis peaks 62 can occur as is shown in FIG. 11*a*. By optimizing the curvature of side walls 38, on-axis performance can be improved, as is shown in FIG. 11*b*.

Materials Used

In general, brightness enhancement film 30 can be formed in a number of ways. In a preferred embodiment, brightness enhancement film 30 is formed from an acrylic film; however, brightness enhancement film 30 may be formed from any of various types of transparent materials, including polycarbonate or polymethyl methacrylate (PMMA), for example. A requirement for the base substrate is an index of refraction, n, that is at least about $\sqrt{2}$ or greater. The material used for brightness enhancement film 30 should have an index of refraction n that is identical to, or nearly the same as, the index of refraction n of light guiding plate 14, 54.

Typical Dimensions Shape and Fabrication

Typical preferred values and ranges for brightness enhancement film 30 fabricated according to the present invention include the following:
  (i) Pitch K between adjacent light collecting structures 42 (FIG. 5): 80 microns. This value is typically between 10-200 microns.
  (ii) Height H (FIG. 9*b*): 25 microns. The height value is typically in the range from 10-100 microns. A number of factors determine the optimal height for a specific application, including aperture sizes and side wall 38 curvature.
  (iii) Prism angle for prism array structure 50 (FIG. 6*b*): 100°.
  (iv) Ratio of input aperture to output aperture: in the range from 1:1.5 to 1:10.

Brightness enhancement film 30 can be used to improve uniformity for surface-imaging devices that have non-uniform brightness characteristics. In order to be useful for this purpose, a non-uniform structuring and spatial distribution of light collecting structures 42 themselves can be used. Non-uniform structuring can be achieved, for example, by changes to the direction of light collecting structures 42 along a length. With reference to FIG. 4*a*, spatial uniformity for brightness enhancement film 30 may be enhanced using grooves 45 that do not run precisely in parallel along the input surface of the substrate used for brightness enhancement film 30.

Figure 12:
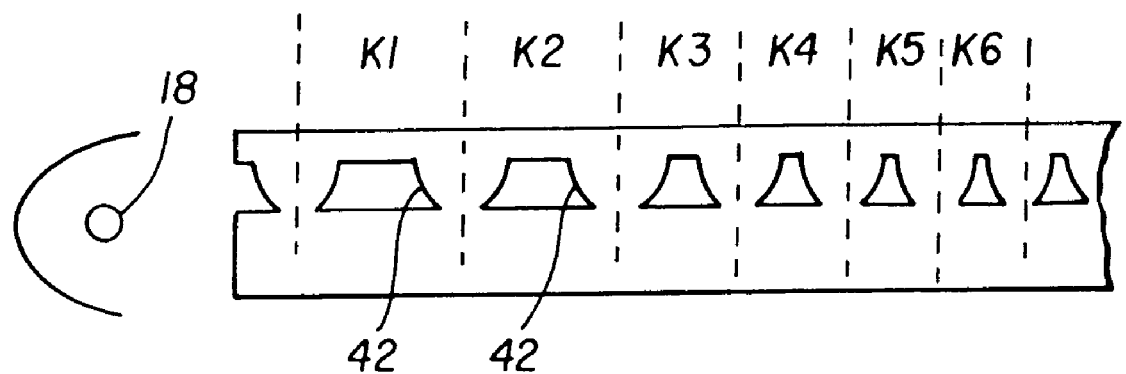
FIG. 12 is a cross-sectional side view showing an embodiment in which the pitch between adjacent light collecting structures is varied.

Pitch K can also be varied as necessary to provide improved uniformity. Referring to the side view of FIG. 12, there is shown one arrangement in which non-homogeneous distribution of light collecting structures 42 is used. Here, the further the distance from light source 18, the tighter the spacing of pitch K1, K2, K3, K4, K5, and K6 used between light collecting structures 42. Where two light sources 18 are used, pitch K could be at a minimum at the center of a sheet of brightness enhancement film 30.

Figure 13:
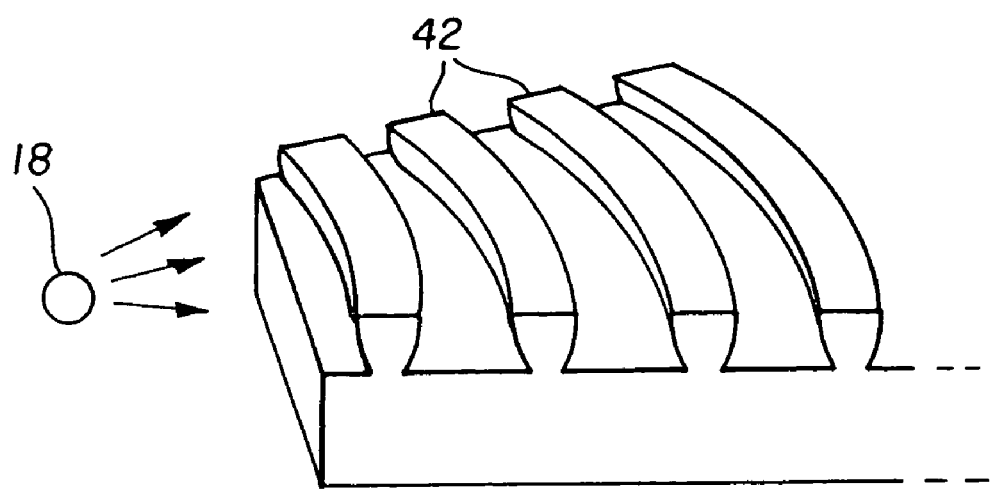
FIG. 13 is a perspective sectional view showing an alternate embodiment in which light collecting structures are formed along a curve; and, FIG. 14 is a perspective view showing a light collecting structure having added randomness in an alternate embodiment.
Figure 14:
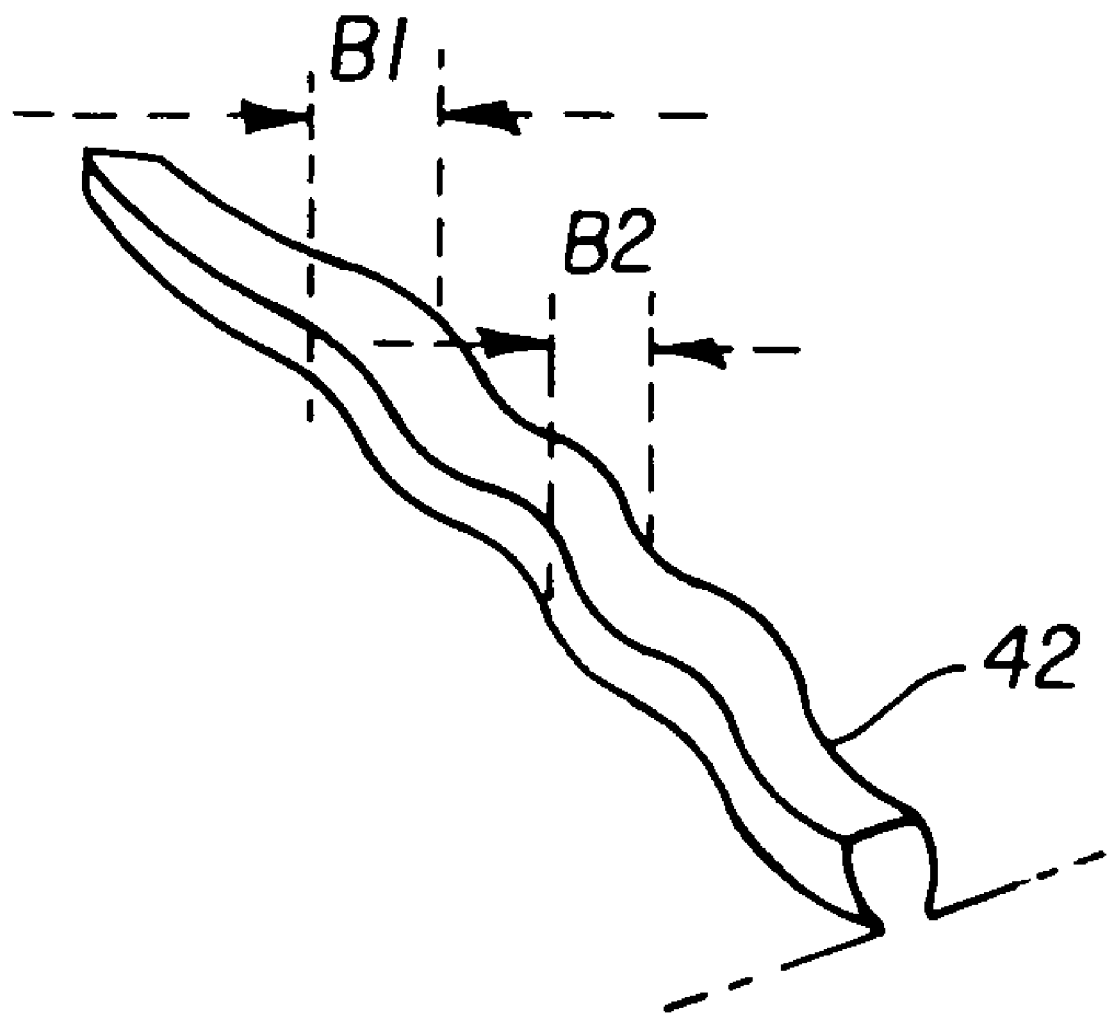

Referring to FIG. 13, there is shown an arrangement of light collecting structures 42 for light source 18 as a point source. Light source 18 could be an LED, for example. Here, light collecting structures 42 are suitably curved to improve luminance and uniformity. FIG. 14 shows other possible modifications to light collecting structures 42, including changing breadth dimensions B1 and B2 at various locations along the length of light collecting structure 42. Another alternative is to vary the path of light collecting structures 42 as shown in FIG. 14, employing a regular or irregular undulating variation to a linear arrangement. This strategy could be used to reduce moiré patterning, for example.

Brightness enhancement film 30 of the present invention can be fabricated in a number of ways, such as using methods for forming grooves 45 (FIG. 4*a*) in a sheet of substrate material, for example. Scribing of a substrate is one possible method for forming light collecting structures 42. Various molding techniques could alternately be employed for forming light collecting structures 42, such as molding, including injection roll molding, using web-based fabrication, or extrusion molding, using an extrusion plate. Brightness enhancement film 30 could be fabricated as a sheet and laminated onto an existing type of light providing surface such as a light guiding plate, for example.

For using brightness enhancement film 30 of the present invention in a backlighting application, such as is shown in FIGS. 6*a*, 6*b*, and 7, the following special requirements should be met:
  (i) the material used to form brightness enhancement film 30 has substantially the same index of refraction n as that of light guiding plate 54, to within about +/−0.1;
  (ii) light guiding plate 54 for this embodiment does not provide a diffuser;
  (iii) input aperture 33 of light collecting structure 42 is in direct contact with light guiding plate 54, that is, the flat surface of input aperture 33 lies against light guiding plate 54 without any air gap. Input aperture 33 may be glued, pressed into, molded onto, formed as part of, or otherwise attached to the surface of light guiding plate 54, for example.

For this embodiment, light guiding plate 54, a type of light pipe, also requires a reflective surface opposite its light source, using a configuration well known to those skilled in the art of LCD backlighting techniques. Referring to FIG. 6, for example, a suitable arrangement for light guiding plate 54 is shown, with a reflective surface 24 opposite light source 18 and with external surfaces joined at right angles.

Alternative Embodiment for Backlighting

Light source 18 as shown in FIG. 5 could be a conventional CCFL fluorescent bulb or could be embodied as other types of sources. For example, one or more LEDs could be used instead of the conventional CCFL bulb as light source 18, directing light into light guiding plate 14 or other suitable waveguide.

Uses for Area Lighting Applications

The above description focused primarily on use of brightness enhancement film 30 of the present invention in backlit display applications. However, the array of linearly extended light-collecting structures 42 used in the present invention could also be used in area lighting applications. The capability of these structures to accept light at a broad range of angles and redirect that light toward a normal axis suggests a range of possible uses, such as for reading lamps and surgical lighting apparatus, for example. Brightness enhancement film 30 of the present invention is particularly well-suited to lighting applications that provide a directed and uniform area of light.

It is a feature of the present invention that it adapts light-redirecting properties used in CPCs and similar structures to achieve a highly efficient redistribution of light. Advantages of the present invention over other brightness enhancing films include improved on-axis and near-axis luminance gain and enhanced control over light distribution angles. The present invention provides a compact, integrated solution for brightness enhancement. Optically coupled to the light guiding plate itself, the film of the present invention requires no separation distance. The present invention does not require use of a high-quality reflective backing for the light guiding plate. Instead, the film of the present invention directs light using wave-guiding effects and Total Internal Reflection (TIR), with minimal loss from reflection. A film fabricated according to the present invention can be used with DBEF (Dual Brightness Enhancement Film) materials or with other types of reflective polarizers.

It is yet a further advantage of the present invention that it allows the use of a wide range of transparent materials for brightness enhancement fabrication. The apparatus and methods of the present invention advantageously provide ways to improve spatial uniformity in a manufacturable brightness enhancement film design.

The invention has been described with reference to a preferred embodiment; However, it will be appreciated that variations and modifications can be effected by a person of ordinary skill in the art without departing from the scope of the invention. For example, while the ideal parabolic shape of FIG. 3 has particular advantages, approximations to parabolic shape are also effective for redirection of light toward the normal axis.

The brightness enhancement film of the present invention directs off-axis light toward a normal axis relative to the film surface and is, therefore, particularly well-suited for use with LCD display devices and for other types of backlit displays.

Parts List

10. Brightness enhancement film
12. Smooth side
14. Light guiding plate
16. Prismatic structures
18. Light source
19. Reflective surface
20. LCD component
22, 24. Reflective surface
26. Luminance curve
30. Brightness enhancement film
32. Light collecting structure
33. Input aperture
34. Input surface
35. Output aperture
36. Output surface
38. Side wall
42. Light-collecting structure
44. Input surface
45. Groove
48. Crossing point
50. Prism array structure
54. Light guiding plate
58. Illumination system
60. Display apparatus
62. Off-axis peak
64. Light conditioning article
H=height
W=Width
K, K1, K2, K3, K4, K5, K6=Pitch
L=Length
R, R1, R3, R4. Rays

The invention claimed is:

1. A brightness enhancement article for providing light from a light guiding plate surface, the brightness enhancement article comprising a plurality of light collecting structures, wherein adjacent light collecting structures are arranged to vary their direction along their length on the light-providing light guiding plate surface, each light collecting structure comprising:
    (a) an input aperture optically coupled to the light-providing surface;
    (b) an output aperture distal from said input aperture, wherein the output aperture has a surface area that is larger than the surface area of the input aperture and wherein the width of the output aperture varies over the length of the light collecting structure alone the light guiding plate surface; and,
    (c) a pair of curved side walls extending along the length direction and extended from the output aperture toward the input aperture; wherein, in a cross section taken orthogonally with respect to the length direction, the curved side walls approximate a parabolic curvature.

2. The brightness enhancement article according to claim 1 wherein adjacent light collecting structures are arranged to follow concentric circular paths on the light-providing light guiding plate surface.

3. The brightness enhancement article according to claim 1 wherein light collecting structures are arranged to follow curved paths with dimensional modifications along the length thereof on the light guiding plate surface.

4. The brightness enhancement article according to claim 1 wherein the light guiding plate surface and at least one light collecting structure have the same refractive index.

5. The brightness enhancement article according to claim 1 wherein the pitch between adjacent light collecting structures is substantially equal.

6. The brightness enhancement article according to claim 1 wherein the curved side walls of the light collecting structure between the input and output aperature provide total internal reflection to direct light incident at the input aperture to the output aperture.

* * * * *